United States Patent [19]
Cuthbertson et al.

[11] Patent Number: 5,498,066
[45] Date of Patent: Mar. 12, 1996

[54] ARTICULATED COVER FOR A TOP LOADING HAULING BODY

[75] Inventors: Robert A. Cuthbertson, Sunderland; Barry E. James, Hartlepool, both of England; Carlos E. Magalhaes, Decatur, Ill.; Jerry F. Smith, Biddick Washington, England

[73] Assignee: Caterpillar Inc., Peoria, Ill.

[21] Appl. No.: 303,807

[22] Filed: Sep. 9, 1994

[51] Int. Cl.⁶ ...................................................... B60P 1/26
[52] U.S. Cl. .................... 298/23 C; 105/377.04; 105/377.06; 296/100; 298/23 DF
[58] Field of Search .................... 296/100, 101, 296/108; 298/23 C, 23 DF, 23 R; 105/377.01, 377.04, 377.05, 377.06

[56] References Cited

U.S. PATENT DOCUMENTS

| | | |
|---|---|---|
| 2,941,682 | 6/1960 | Keys. |
| 3,833,255 | 9/1974 | Logue ........................ 296/101 |
| 3,913,969 | 1/1975 | Hoch ........................ 296/100 |
| 4,585,266 | 4/1986 | Steinberg ............ 105/377.05 X |
| 5,011,214 | 4/1991 | Friesen et al. .............. 296/100 |

FOREIGN PATENT DOCUMENTS

| | | |
|---|---|---|
| 9311214 | 11/1993 | Germany. |
| 281057 | 12/1970 | U.S.S.R.. |
| 1073141 | 2/1984 | U.S.S.R. ...................... 296/100 |
| 1268448 | 11/1986 | U.S.S.R.. |

Primary Examiner—Michael S. Huppert
Assistant Examiner—Janice L. Krizek
Attorney, Agent, or Firm—Loyal O. Watts

[57] ABSTRACT

Trucks which haul waste and fine, loose materials which are top loading through an open top need a cover to retain the material such as during travel. A full length cover, when raised for loading, may adversely affect the stability of the truck. An articulated cover includes a forward portion pivotally connected to the truck hauling body and a rearward portion pivotally connected to the forward portion. When the forward portion is raised the rearward portion folds downward against and parallel to the forward portion. This reduces the height of the raised cover to approximately one-half of the cover total length. Tie members are connected to the rear portion of the cover and to the hauling body and engage guide members on the cover to cause the rearward portion to unfold to an extended position when the forward portion is pivoted toward a closed position. This structure permits the cover to extend substantially the full length of the open top of the body when closed and yet extend less than that distance when the cover is raised to the open position.

18 Claims, 6 Drawing Sheets

Fig_6_
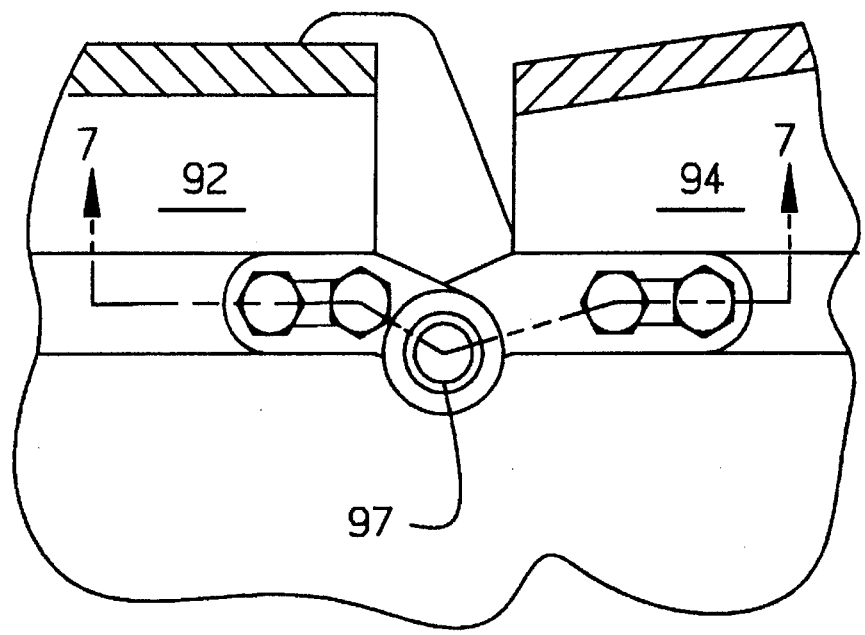
Fig_7_
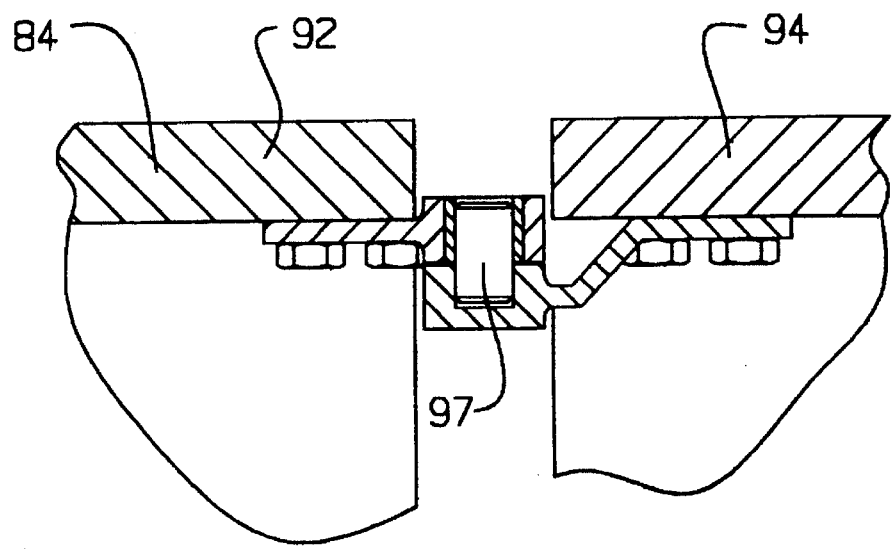

ARTICULATED COVER FOR A TOP LOADING HAULING BODY

TECHNICAL FIELD

This invention relates generally to a top loading, hauling body and more particularly to a top cover adapted to be pivotally attached to a hauling body.

BACKGROUND ART

In machines having top loading, hauling bodies it is desirable to provide a pivoting cover to retain the load in the body during travel of the machine. Otherwise, loads of material such as waste, grain, sand, dirt and other fine material tend to be blown from the body by air currents resulting from ambient winds, air flow due to the speed of the machine or both. This is objectionable due to loss of a portion of the payload as well as undesirable deposit of the material on the roadway and adjacent property.

Thus for various reasons closure means are desirable to prevent loss of material from open-topped truck bodies.

In currently known machines it is common practice to provide various covers or doors over openings in the body to retain the payload within the body during transit and until the operator is ready to dump the load. In most cases, however, the covers open automatically responsive to tilting of the body or must be opened by power means, such as hydraulic cylinders, to permit the payload to exit the body as it is pivoted to the dumping position. In many instances opening of the cover during dumping raises the center of gravity of the machine an amount sufficient to cause instability of the machine. This change in the position of the center of gravity may contribute to an overturning moment if the machine is on a side incline or is moving as the load is being dumped.

U.S. Pat. No. 2,941,682 issued Jun. 21, 1954, to C. R. Keys, U.S. Pat. No. 3,913,969 issued Oct. 21, 1975, to N. R. Hoch, USSR Patents 1,268,448 issued Nov. 7, 1986, and USSR Patent 281,057 issued Dec. 3, 1970, show various dump bodies having covers associated with openings therein. In all of these instances it is indicated that the covers must be in an open position when the body is tilted for dumping of the load therefrom.

Thus it is desirable to provide a dump body having a cover which may remain closed when the body is tilted for dumping. This maintains a relatively low center of gravity of the machine to enhance stability of the machine when the body is tilted for dumping of the load. It is also desirable to maintain a relatively low center of gravity during a top loading exercise during which the cover must be open.

DISCLOSURE OF THE INVENTION

In one aspect of the invention a top loading, hauling body adapted for mounting on a mobile transporter includes a container portion adapted to be pivotally connected to the transporter. The container portion has a bottom wall, two laterally spaced side walls attached to the lateral edges of the bottom wall and a front wall connecting the forward edges of the bottom and side walls. The side walls and the front wall define an open top of the container portion. The side walls and the bottom wall define an open rear end of the container portion. A power means is adapted for connection between the container portion and the transporter for moving the container portion between a substantially horizontal position and a tilted position when installed and operated.

An articulated cover is disposed in substantial closing relation to the open top of the container portion of the hauling body and is pivotally connected to the container portion adjacent the upper edge of the front wall. The cover includes a forward portion and a rearward portion pivotally attached to the rearward edge of the forward portion.

A means is provided for selectively raising the cover to an open position, when assembled with the transporter, to permit loading of material into the container portion and for closing the cover when loading is completed.

In another aspect of the invention an articulated cover is adapted for pivotal mounting on a top loading, hauling body of a truck or mobile transporter, the articulated cover comprises a means which is provided for pivotally mounting the articulated cover to the hauling body when installed. The articulated cover includes a forward portion and a rearward portion pivotally connected at its forward edge to the rearward edge of the forward portion, the rearward portion including at least one bracket secured adjacent to the forward edge thereof. At least one tie member is connected to the at least one bracket and is adapted to be connected to the hauling body at a point disposed adjacent the forward end of the forward portion of the articulated cover when installed thereon. At least one guide member is mounted on the articulated cover adjacent the pivotal connection of the rearward and forward portions in substantially vertical alignment with the at least one tie member.

BRIEF DESCRIPTION OF THE DRAWINGS

FIG. 6 is an enlarged fragmentary view, taken along line 6—6 of FIG. 2, and showing certain details of the present invention; and FIG. 7 is a fragmentary cross-sectional view, taken along line 7—7 of FIG. 6, and showing additional details of that portion of the present invention.

BEST MODE FOR CARRYING OUT THE INVENTION

Figure 1:
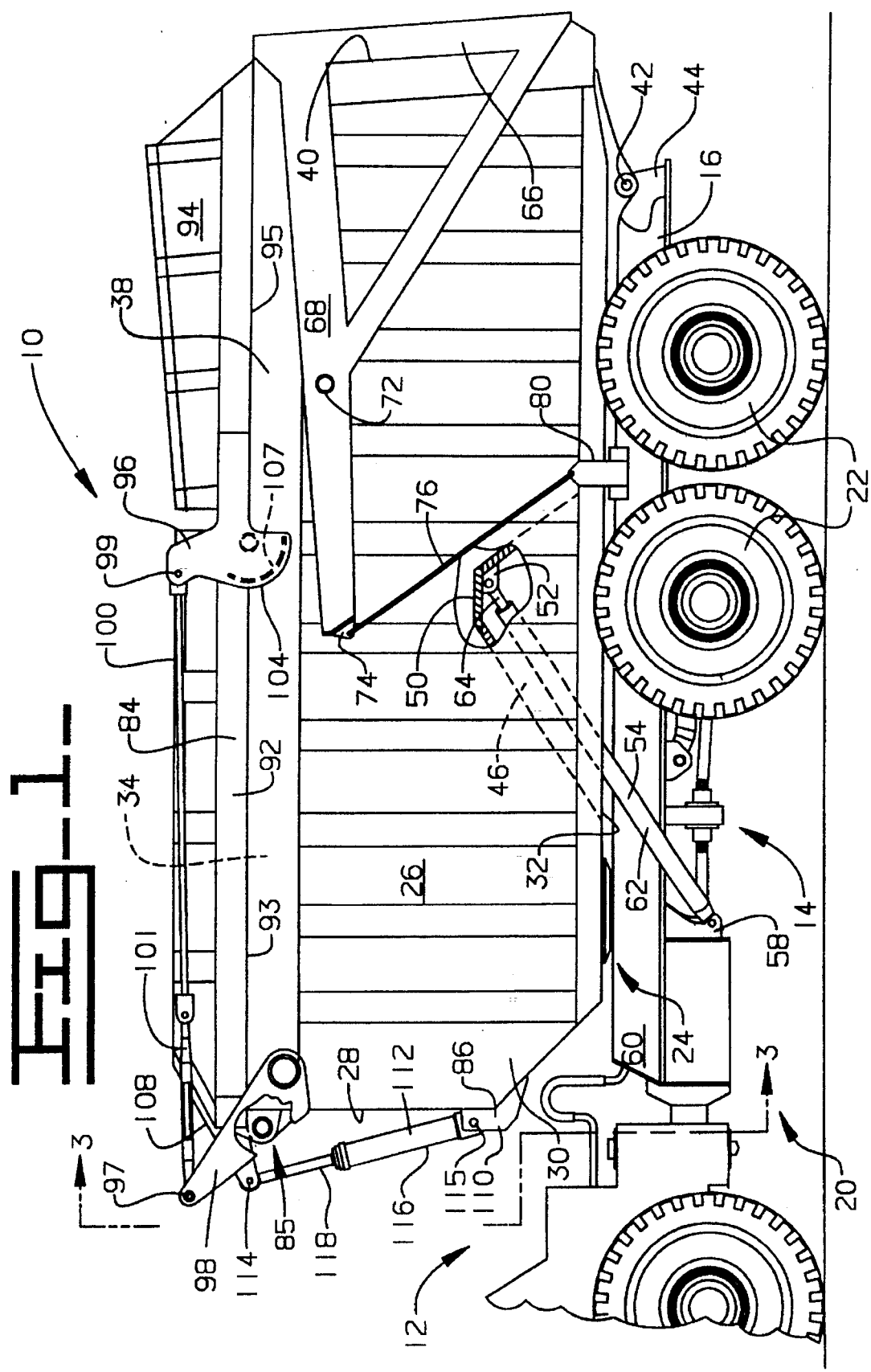
FIG. 1 is a plan side view of a rear portion of an articulated truck incorporating the present invention.

Referring to the drawings, and particularly to FIG. 1, an articulated truck or mobile transporter 10 is illustrated including a tractor portion 12, a fragmentary portion of which is shown, and a rear hauling portion 14 including a frame 16 extending longitudinally rearwardly from a steering and articulation joint 20 of conventional design. Tandem wheels 22 are conventionally provided on each side of the frame for supporting and propelling the truck 10.

The tractor portion 12 is related to the invention only to the extent it provides an operators station and a control mechanism for operation of the truck components, therefore, only a fragmentary portion is shown in the drawings.

A rear dumping body 24 includes a container portion 26 having a generally upstanding front wall 28, a pair of laterally spaced side walls 30 and a bottom wall 32. The side walls 30 are secured to the lateral edges of the bottom and front walls 32,28 in generally upstanding relation thereto, to define a load holding compartment 34. The upper edges of the front wall and the spaced side walls define a top opening 38 while the rearward edges of the side walls 30 and the bottom wall 32 define a rear opening 40.

The container portion is conventionally, pivotally connected at 42, adjacent its rearward end, to an appropriate bracket 44, in this instance a pair of brackets 44, disposed adjacent to a rearward end of and secured to the frame 16. The bottom wall 32 includes a pair of laterally spaced openings 46 each of which are covered by a box like structure 50 including a pair of mounting brackets 52. A pair of body lift cylinders 54 are each pivotally connected at one end to one of a pair of brackets 58 secured to a forward portion 60 of the frame 16 and extend rearwardly, upwardly and outwardly into the box like structures where they are each pivotally connected to one of the mounting brackets 52. The lift cylinders each include a tubular cylinder portion 62 and a rod portion 64 telescopically mounted in the cylinder portion such that extension of the rod raises the body 24 to a dumping position and retraction of the rod lowers the body to a loading and carrying position. The truck or transporter is disclosed and described as being of the rear dumping type with reference to forward and rearward with respect to elements, movement and positions or relationships. It should be understood that the articulated cover of the present invention may also be easily applied to hauling bodies of the side dumping or bottom dumping type as well as ejector type discharge of the contents thereof. Therefore, references to forward and rearward should not be considered limiting in a directional sense.

A tailgate 66 is disposed in closing relation to the rear opening 40 of the container portion and includes a pair of arms 68 disposed, in this embodiment, laterally outwardly of the sidewalls and extending forwardly therealong. Each of the arms 68 are pivotally connected, intermediate its ends, to the respective one of the side walls by a pivot pin 72. A means is provided for pivoting the tailgate between open and closed positions and includes a pair of brackets 74 each secured adjacent the forward end of each of the arms 68. The means for pivoting also includes a pair of restraint members 76, such as fixed length cables or chains, individually connected to one of the brackets 74 adjacent the forward end of each of the arms 68. The restraint members 76 extend rearwardly and downwardly and are connected to a pair of brackets 80 secured to and extending outwardly and upwardly from the frame 16, further forming a portion of the means for pivoting.

Figure 2:
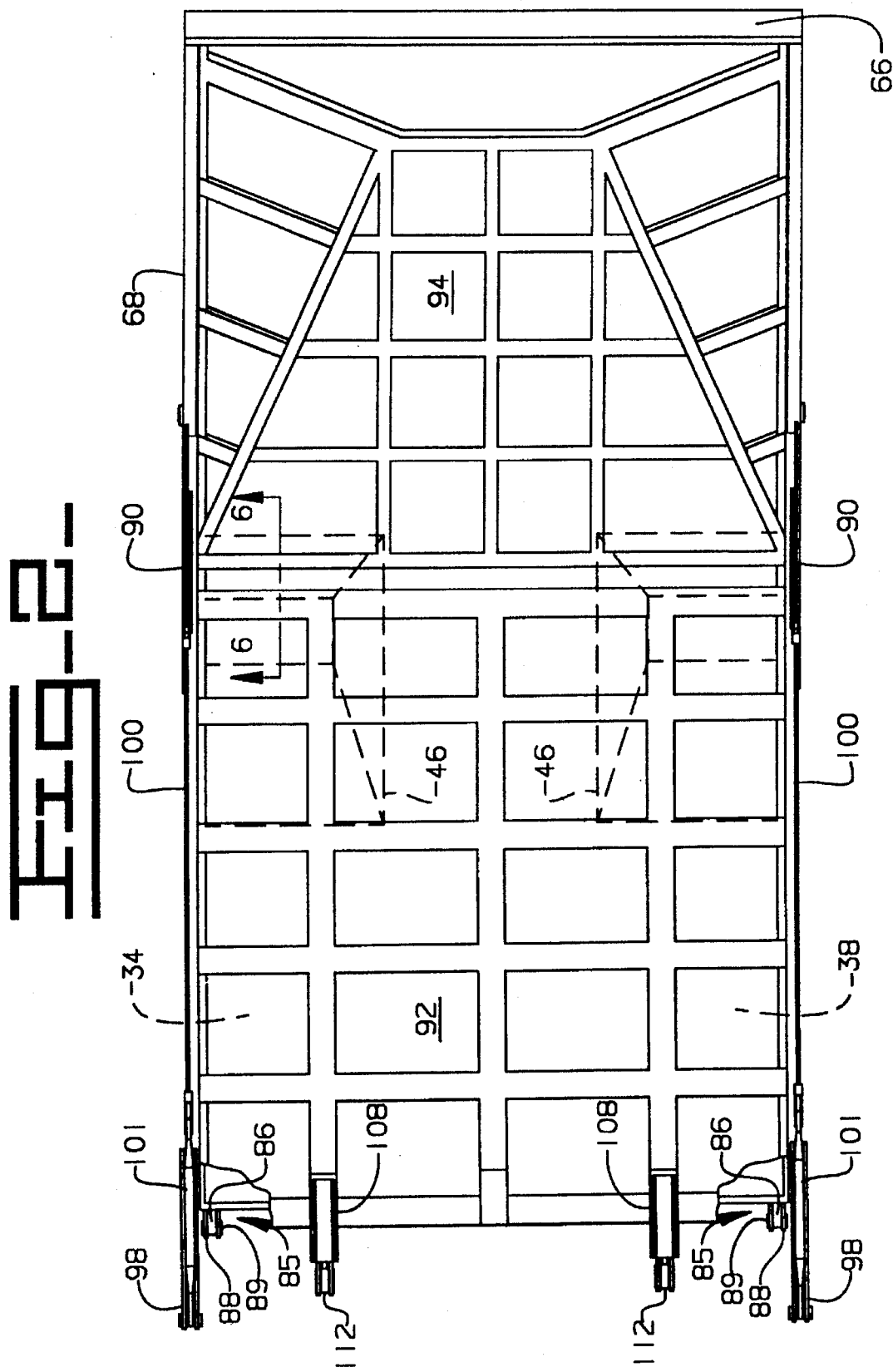
FIG. 2 is a top plan view of the articulated truck of FIG. 1 and incorporating the present invention.
Figure 3:
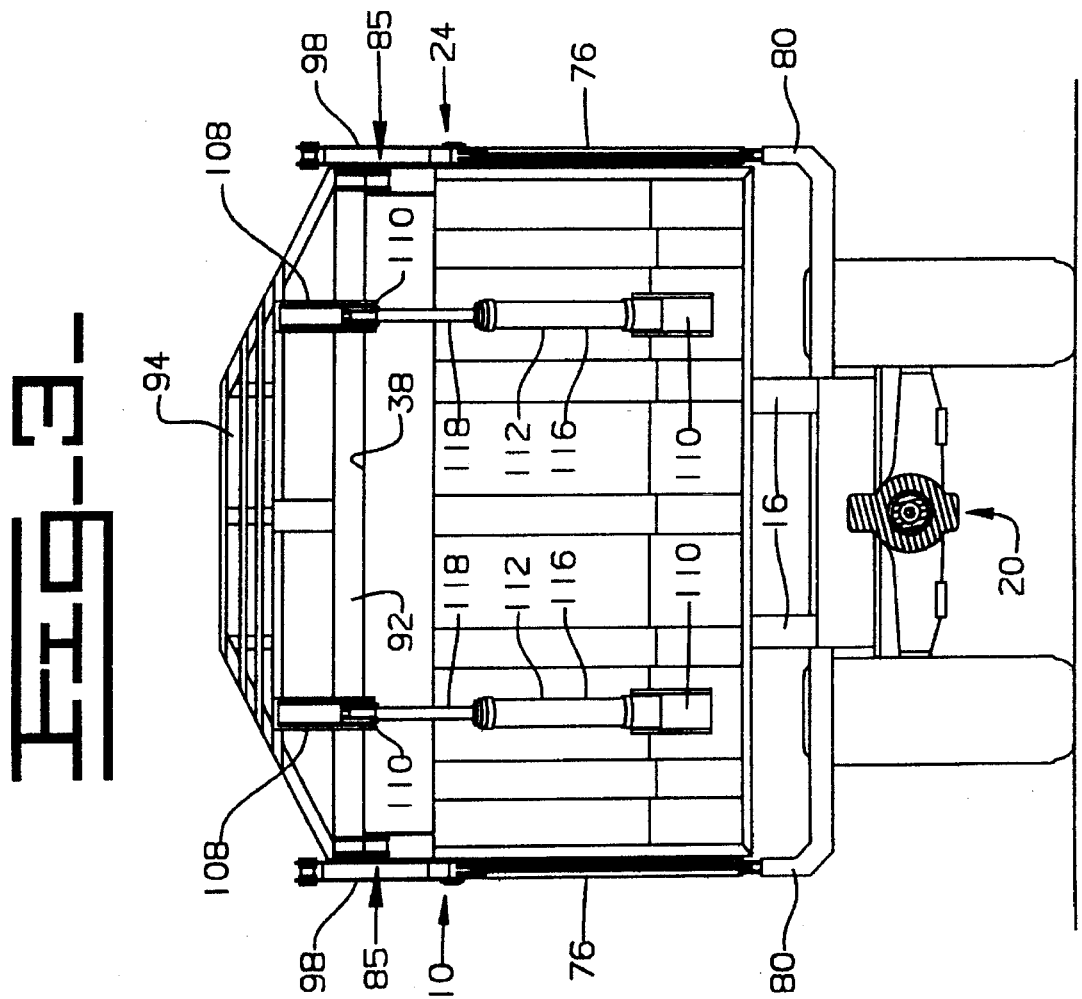
FIG. 3 is a view taken along line 3—3 of FIG. 1 and showing certain elements of the present invention.
Figure 4:
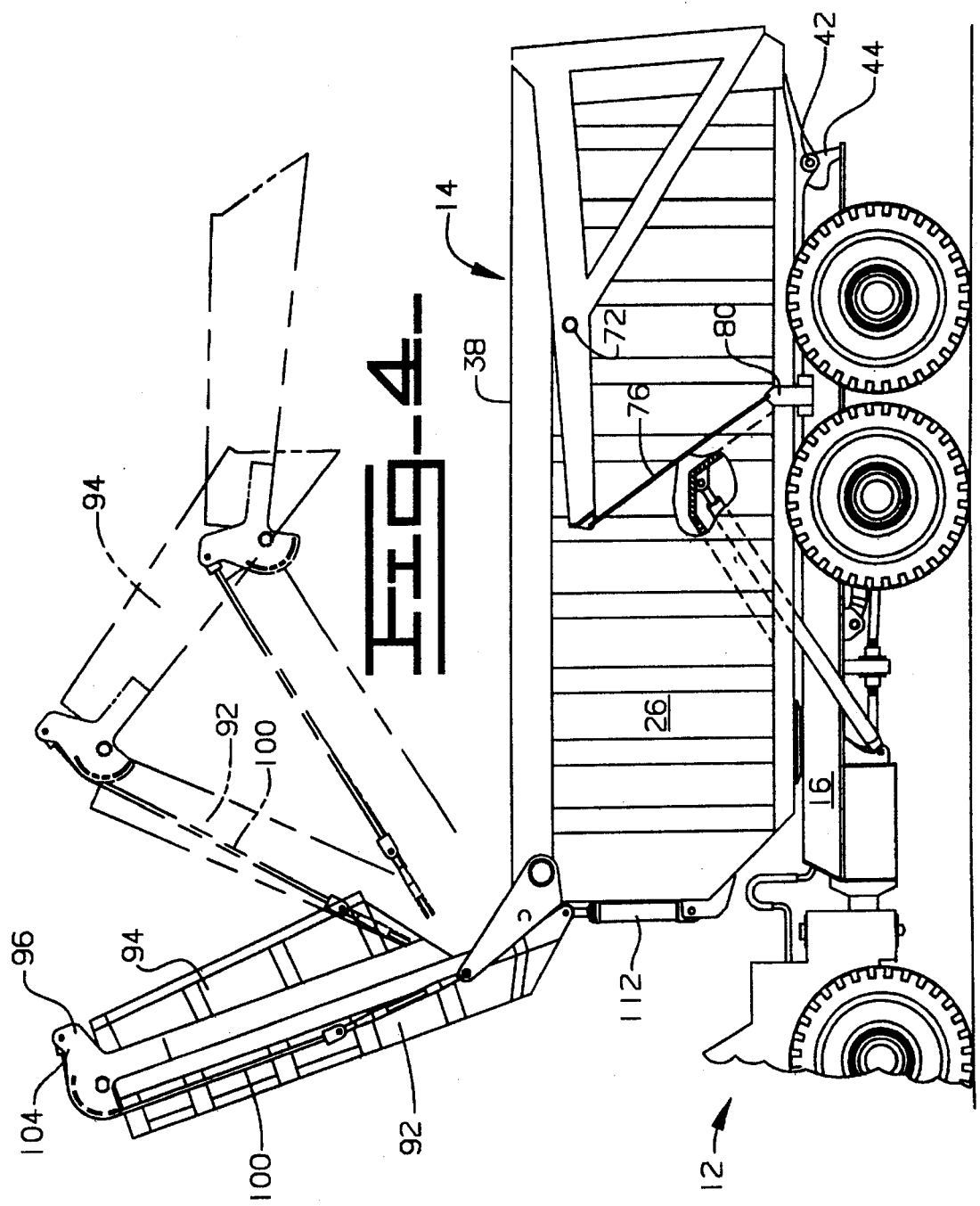
FIG. 4 is a side view similar to FIG. 1 with certain elements of the invention shown in various operated positions.

An articulated cover 84 is disposed in covering relation to the top opening of the container portion 26. Means 85 are provided for pivotally connecting the articulated cover to the container portion adjacent the upper edge of the front wall thereof. As is further illustrated in FIG. 2, the means 85 for connecting includes an at least one bracket 86, in this embodiment a pair of brackets 86, are secured to the upper front face of the front wall 28. The means 85 for connecting includes an at least one bracket, in this case a pair of brackets 88, secured to the forward edge of the articulated cover 84 for mating engagement with the brackets 86. Also included are a pair of pins 89 which pivotally connects the brackets 86 and 88 to pivotally mount the cover to the container portion.

The articulated cover 84 includes a forward portion 92 and a rearward portion 94 having inner surfaces 93 and 95 respectively with the forward edge of the rearward portion being pivotally connected at 97, best shown in FIGS. 6 and 7, to the rear edge of the forward portion by a conventional type pivot connection. The rearward portion 94 of the cover includes an at least one bracket 96, in this embodiment a pair of spaced brackets 96, secured along the outer edge thereof. An at least one bracket 98, in this embodiment a pair of laterally spaced brackets 98, are individually secured to the upper, forward corners of the spaced side walls 30 in substantially longitudinal alignment with the spaced brackets 96. The relative lengths of the forward and rearward portions of the cover to the overall length of the cover should preferably be 50–70% for the forward portion and 30–50% for the rearward portion. In a preferred arrangement, as illustrated, the relationship is approximately 60/40 with the forward portion being the longest.

An at least one tie member 100, in this embodiment a pair of elongate tie members 100, are individually connected, by adjustable turn-buckles 101, at a front end to the respective one of the brackets 98 and at a rear end to the respective one of the brackets 96 by pins 103 and 99 respectively.

An at least one guide member, in this embodiment a pair of guide members 104, are individually, integrally incorporated as part of the structure of the pair of brackets 96. The integral guide members are mounted in substantially vertical alignment with the tie members 100 and each have a part cylindrical, or other suitably shaped, outer surface 107 for engagement with the respective tie member 100 when the cover is fully opened. The tie members 100 include a flexible portion, and in particular the portion which is disposed in substantially vertical alignment with the guide members 104 for purposes to be later explained.

Figure 5:
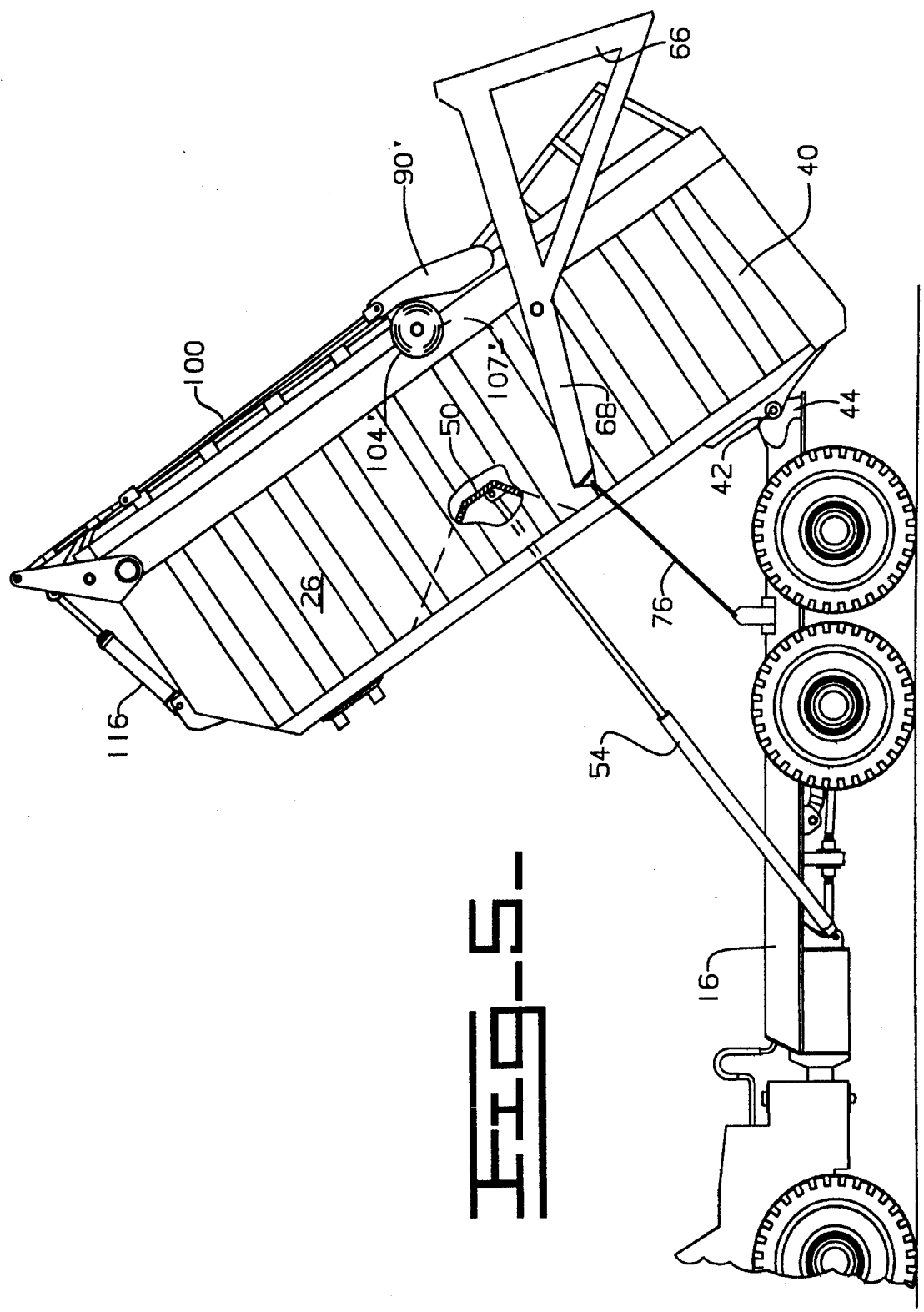
FIG. 5 is a side view similar to FIG. 1 with certain elements of the present invention shown in a different operating position.

FIG. 5 shows an alternate embodiment in which a bracket 96', in this embodiment a pair of brackets, is secured to the rearward portion 94 of the cover. The guide member includes a pair of separately mounted reels 104' also mounted to the rearward portion 94 of the cover adjacent the pivotal connection of the forward and rearward portions of the cover. The reels each include an outer surface 107' for engagement with the tie members 100 as will be later described. It is also recognized that a single set of the brackets 96,98, a single tie member 100 and a single reel or guide member 104 may be used.

A pair of brackets 108 are secured in spaced relation along the forward edge of the forward portion of the articulated cover 84 and extend forwardly thereof. A complementary pair of laterally spaced brackets 110 are mounted on the front face of the front wall 28 of the container portion 26 in substantial alignment with and elevationally spaced from the brackets 108. A pair of hydraulic cylinders 112 are individually connected at an upper end to the respective brackets 108 by a pair of pins 114 and at a lower end to the brackets 110 by a pair of pins 115. The hydraulic cylinders include a tubular cylinder 116 and a piston rod 118 telescopically mounted in the tubular cylinder.

Retraction of the rods 118 is effective to raise the articulated cover 84 for loading of material through the top opening of the container portion. Extension of the piston rod 118 is effective to lower the cover 84 to a closed position for carrying and dumping of the material from the container portion.

INDUSTRIAL APPLICABILITY

In use the truck/transporter 10 is spotted to receive material by loading, by any conventional means through the top opening of the container portion 26. The operator then actuates an appropriate control (not shown) to communicate a suitable fluid, in this instance hydraulic fluid, to the rod or upper end of the hydraulic cylinders to retract the rods 118 and rotate the cover from the closed position to a fully open position to allow access to the load holding compartment 34 for deposit of material therein. As the cover rotates about the pins 89 the rearward portion 94 is free to rotate downward by gravity.

When the cover 84 is fully open, the inner face 95 of the rearward portion 94 substantially contacts the inner face 93 of the forward portion 92. As a result the height of the articulated cover 84, in the open position, is in the range of 50 to 70% of the total length of the articulated cover and in a preferred embodiment is substantially 60% of the total length of the cover. This arrangement reduces the possibility of bulldozing any material lying on the top edges of the container sidewalls. This also minimizes any change in the location of the center of gravity of the truck/transporter to minimize any adverse effect on the stability of the truck.

As the rearward portion 94 folds downward toward its fully collapsed position the tie members 100 move into contact with and wrap partially around the cylindrical outer surfaces 107 of the guide members 104 to condition the tie members to a taut condition, for purposes as will be later explained. The cover, in its fully open position, is tilted forwardly beyond a vertical position to position the rearward portion such that the open top is substantially fully exposed to maximize the use of the body volume.

When the load holding compartment 34 is loaded to the desired amount the operator again actuates the control to lower the articulated cover 84 toward its closed position. As the cover 84 pivots rearwardly toward its closed position the location of the tie member connecting pins 103 above and forward of the pivot pins 89 and the tautness of the tie members 100 causes the tie members 100 to pull the rearward portion of the cover rearwardly to the extended position to cover the rear portion of the container portion 26. The rearward portion is fully extended when the cover touches the upper edges of the container sidewalls. As the rearward portion 94 reaches its fully extended position and touches the top edges of the container portion sidewalls the tie members 100 assume a slightly relaxed condition. With the articulated cover closed the operator may begin transit to the dumping location.

Upon arrival at the dump site the operator may actuate a control to direct hydraulic fluid to the to the body lift cylinders 54. The fluid is directed to the head or lower end of the cylinders 54 to extend the rod portion 64 which raises the dump body 24 about the pivotal connection 42. As the dump body pivots relative to the frame 16 the restraint members 76 causes the tailgate to be pivoted upwardly to open the rear opening of the container portion 26. The pivoting of the dump body and simultaneous opening of the tailgate allows the material in the load holding compartment 34 to be discharged through the rear opening 40 of the dump body. Although the opening of the tailgate is shown and described as occurring automatically it should be understood that it could be opened under independent control of the operator. This could be accomplished by providing power means such as hydraulic cylinders attached between the arms 68 and an appropriate location on the container portion 26.

Since the material in the dump body is discharged through the rear opening the articulated cover 84 may remain in the closed position to again minimize any change in the center of gravity of the truck 10 while the dump body 24 is in the raised position. This is particularly important since it is common in the industry to dump while the truck is moving to distribute the material over a large area. This allows the truck to maintain maximum stability while the dump body is in the raised position.

In view of the forgoing, it is readily apparent that the structure of the present invention provides an articulated cover which is constructed in a manner to minimize deleterious changes in the center of gravity of a truck or transporter during various phases of operation. The invention also prevents or minimizes undesirable loss of the material from the truck during transport from the loading site to the desired dump site. Further, the invention permits the open top of the container portion of the hauling body to be substantially fully exposed to allow loading access to substantially all of the open top of the hauling body.

Other aspects, objects and advantages of this invention can be obtained from a study of the drawings, the disclosure and the appended claims.

We claim:

1. A top loading, hauling body for a mobile transporter, comprising:

a container portion pivotally connected to the transporter and having a bottom wall, two laterally spaced side walls and a front wall connecting the forward edges of the bottom and side walls, the side walls and the front wall defining an open top of the container portion and the side walls and the bottom wall defining an open rear end of the container portion;

power means between the container portion and the transporter for moving the container portion between a substantially horizontal loading and carrying position and a tilted dumping position;

an articulated cover for covering the open top of the container portion, said cover being connected to the container portion by a pivotal connection adjacent the upper edge of the front wall and including a forward portion and a rearward portion, said forward portion having a rearward edge, said rearward portion having a pivotal connection to the rearward edge of the forward portion;

at least one tie member having a rear end connected to the rearward portion of the cover adjacent the pivotal connection between the forward and rearward portions of the cover and a front end connected to the container portion forwardly of the pivotal connection between the forward and rearward portions of the cover;

at least one guide member mounted on the articulated cover in substantially vertical alignment with and elevationally below the at least one tie member; and means for selectively raising the cover to an open position to permit loading of material into the container portion and for lowering the cover when loading is completed.

2. The top loading, hauling body of claim 1 wherein the rearward portion of the articulated cover is pivoted downwardly to a position adjacent the inner surface of the forward portion when the articulated cover is raised to the open position.

3. The top loading, hauling body of claim 2 wherein in the open position the forward portion is tilted forwardly beyond a vertical position an amount sufficient to substantially prevent the rearward portion from obstructing loading access to the open top of the container.

4. The top loading, hauling body of claim 1 wherein the length of the forward portion of the cover is in the range of 50 to 70% of the total length of the cover and the length of the rearward portion is in the range of 30 to 50% of the total length of the cover.

5. The top loading, hauling body of claim 4 wherein the length of the forward portion of the cover is approximately 60% of the total length of the cover and the length of the rearward portion is approximately 40% of the total length of the cover.

6. The top loading, hauling body of claim 1 wherein the tie member is responsive to lowering of the articulated cover toward a closed position for pivoting the rearward portion of the articulated cover to a position covering a rearward portion of the open top of the container portion.

7. The top loading, hauling body of claim 6 wherein the at least one guide member includes a pair of guide members attached to the articulated cover for receiving the at least one tie member when the rearward portion is pivoted to the position adjacent the inner surface of the forward portion.

8. The top loading, hauling body of claim 7 wherein the connection of the at least one tie member to the rearward portion of the articulated cover includes a pair of brackets and the pair of guide members are integral with the pair of brackets.

9. The top loading, hauling body of claim 8 wherein the at least one tie member includes a pair of laterally spaced tie members.

10. The top loading, hauling body of claim 1 wherein the connection of the at least one tie member to the container portion is disposed forwardly of and elevationally above the pivotal connection of the articulated cover to the container portion.

11. The top loading, hauling body of claim 9 wherein each of the tie members includes a flexible portion, said flexible portions wrapping at least partially around the guide members when the rearward portion is disposed adjacent the inner surface of the forward portion.

12. The top loading, hauling body of claim 1 including a tailgate disposed in closing relation to the open rear end of the container portion and having laterally spaced forwardly extending arms connected to the laterally spaced sidewalls by a pivotal connection and extending forwardly of the pivotal connection, and means for pivoting the tailgate between open and closed positions relative to said open rear end of the container portion.

13. The top loading, hauling body of claim 12 wherein the means for pivoting the tailgate is responsive to tilting of the container portion toward said dumping position and includes a restraint member connected between the forward end of the forwardly extending arms and the transporter.

14. An articulated cover for mounting on a top loading, hauling body and for pivotal movement between open and closed positions, comprising:

a forward portion having a rearward edge;

a rearward portion having a forward edge, the forward edge having a bracket and being connected by a pivotal connection to the rearward edge of the forward portion;

a tie member having forward and rearward ends and a flexible portion, the rearward end being connected to the bracket at a location spaced from the pivotal connection of the rearward and forward portions of the cover, said forward end being connectable to said hauling body; and a guide member mounted on the rearward portion and being elevationally below the flexible portion of the tie member when the cover is in the closed position; the guide member and flexible portion of the tie member being in engagement when the cover is in the open position, said flexible portion wrapping at least partially around the guide member in the open position of the cover.

15. The articulated cover of claim 14 wherein the guide member is integrally formed with the bracket of the rearward portion.

16. The articulated cover of claim 14 wherein the rearward portion and forward portion of the articulated cover each has an inner surface and said rearward portion pivots downwardly to a position at which the inner surface of the rearward portion is adjacent the inner surface of the forward portion when the articulated cover is raised toward the open position.

17. The articulated cover of claim 14 wherein the length of the forward portion of the cover is in the range of 50 to 70% of the total length of the cover and the length of the rearward portion is in the range of 30 to 50% of the total length of the cover.

18. The articulated cover of claim 17 wherein the length of the forward portion of the cover is approximately 60% of the total length of the cover and the length of the rearward portion is approximately 40% of the total length of the cover.

* * * * *